United States Patent
Noble et al.

[11] Patent Number: 6,133,702
[45] Date of Patent: Oct. 17, 2000

[54] MULTI-FUNCTION VEHICLE STARTER AND ALTERNATOR AND METHOD THEREFOR

[75] Inventors: Gardiner A. Noble, Farmington; Mark Ciuffetelli, Clarkston; Jean P. Mallebay-Vacqueur, Bloomfield Hills; Christopher P. Thomas, West Bloomfield, all of Mich.

[73] Assignee: Chrysler Corporation, Auburn Hills, Mich.

[21] Appl. No.: 09/193,948

[22] Filed: Nov. 18, 1998

[51] Int. Cl.⁷ ...................................................... H02P 5/20
[52] U.S. Cl. ........................... 318/158; 318/139; 318/523; 290/20; 290/22; 290/36 R; 290/38 R
[58] Field of Search ............................ 318/652, 140–159, 318/139, 521–529; 310/179.25, 156, 216; 290/18–22, 31, 36 R, 38 R

[56] References Cited

U.S. PATENT DOCUMENTS

| | | | |
|---|---|---|---|
| 4,626,696 | 12/1986 | Maucher et al. | 290/38 R |
| 4,772,802 | 9/1988 | Glennon et al. | 290/31 |
| 4,797,602 | 1/1989 | West | 322/10 |
| 4,862,009 | 8/1989 | King | 290/22 |
| 4,873,962 | 10/1989 | Safranek | 123/599 |
| 4,916,345 | 4/1990 | Tong | 310/208 |
| 4,958,095 | 9/1990 | Uchida et al. | 310/59 |
| 5,001,412 | 3/1991 | Carter et al. | |
| 5,097,140 | 3/1992 | Crall | |
| 5,418,400 | 5/1995 | Stockton | 290/46 |
| 5,512,811 | 4/1996 | Latos et al. | 322/10 |
| 5,959,385 | 8/1999 | Kato et al. | 310/112 |

*Primary Examiner*—David Martin
*Attorney, Agent, or Firm*—Mark P. Calcaterra

[57] ABSTRACT

A multi-function apparatus and a method for performing the functions of a starter, alternator and engine stabilization system for an engine of a motor vehicle. The apparatus comprises a rotor, a stator and a switching/detection system associated with the stator. The stator comprises three independent stator sectors which each comprise a plurality of independent stator coils. The rotor comprises a plurality of rotor poles about its periphery. The rotor is secured to the flex plate of the engine and the stator sectors are secured to the bell housing of the vehicle's power train. The stator coils each protrude through opening formed in the bell housing such that the rotor poles are closely adjacent the stator coils without contacting the stator coils as the rotor rotates. The switching/detection system is used to detect the positions of the rotor poles relative to the stator coils and selectively energizes various groups of stator coils for very brief, predetermined time intervals to cause movement of the rotor and therefore assist in starting of the engine. In the alternator mode energy generated in the stator coils is returned to the vehicle's battery. In the engine stabilization mode selected groups of stator coils are periodically energized to assist in smoothing out the idle of the engine of the vehicle at low idle speeds. The apparatus and method can also be used to propel the vehicle for distances determined by the energy stored in the vehicle battery, to act as a supplemental "power booster" and as a brake for effecting powertrain braking.

11 Claims, 6 Drawing Sheets

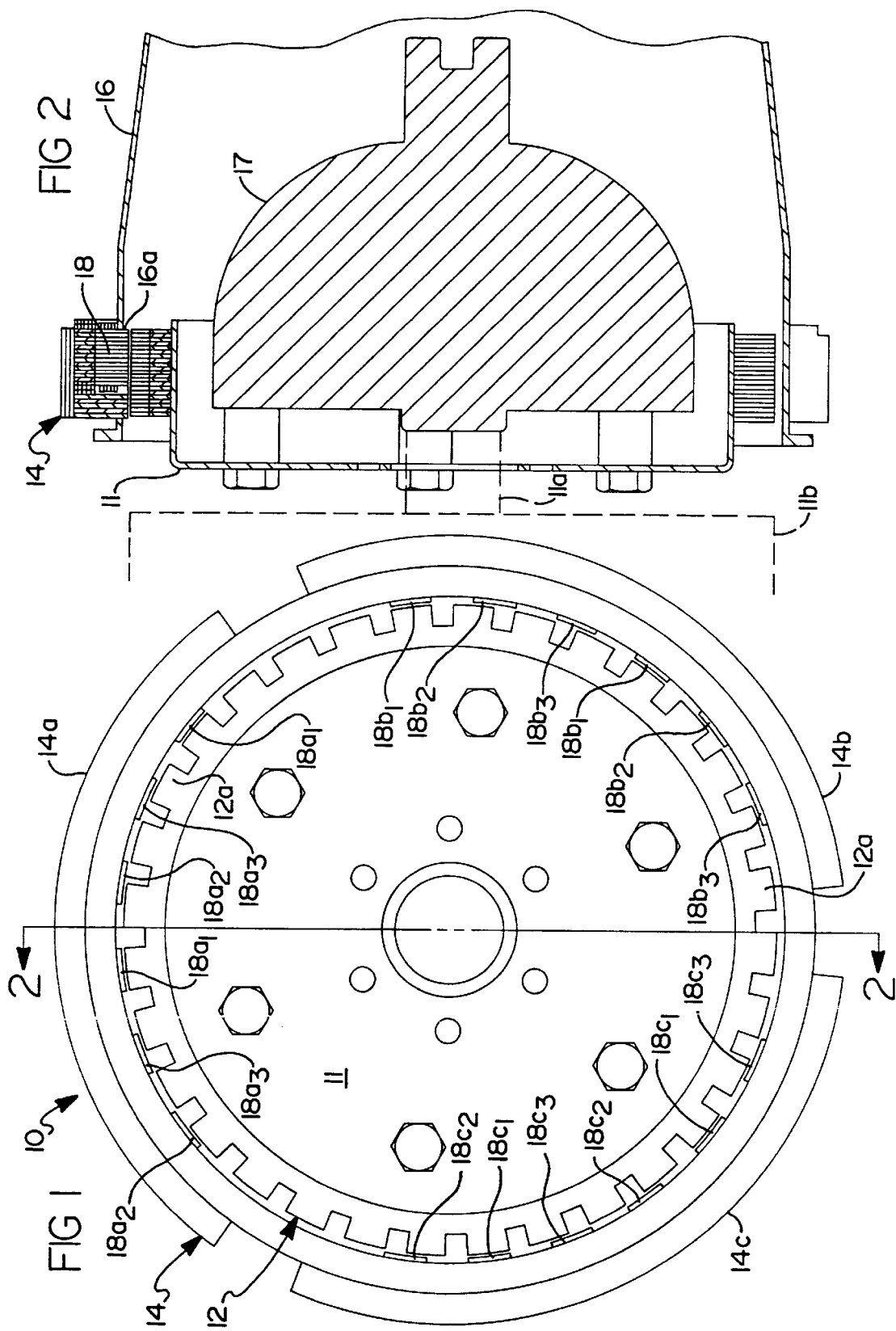

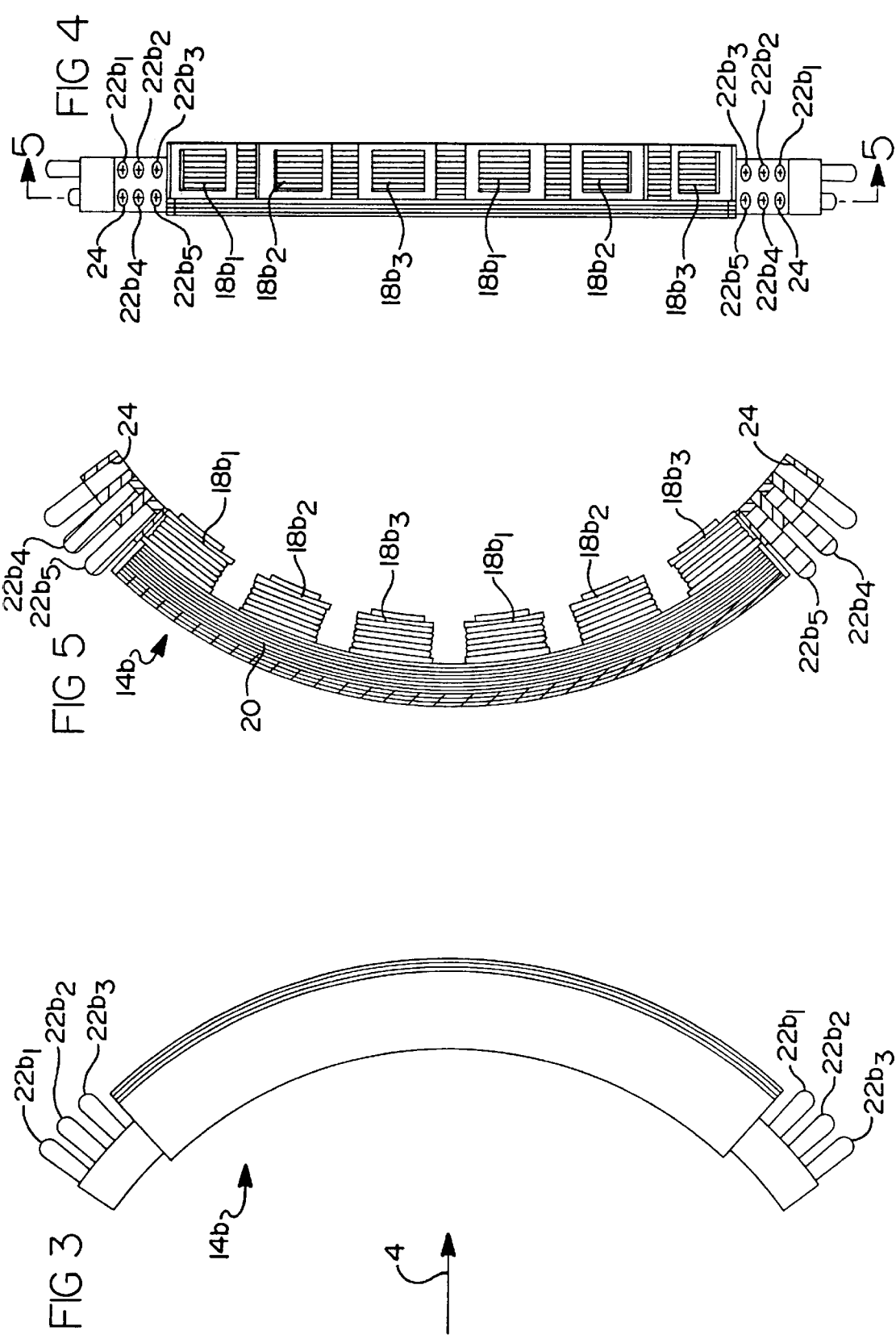

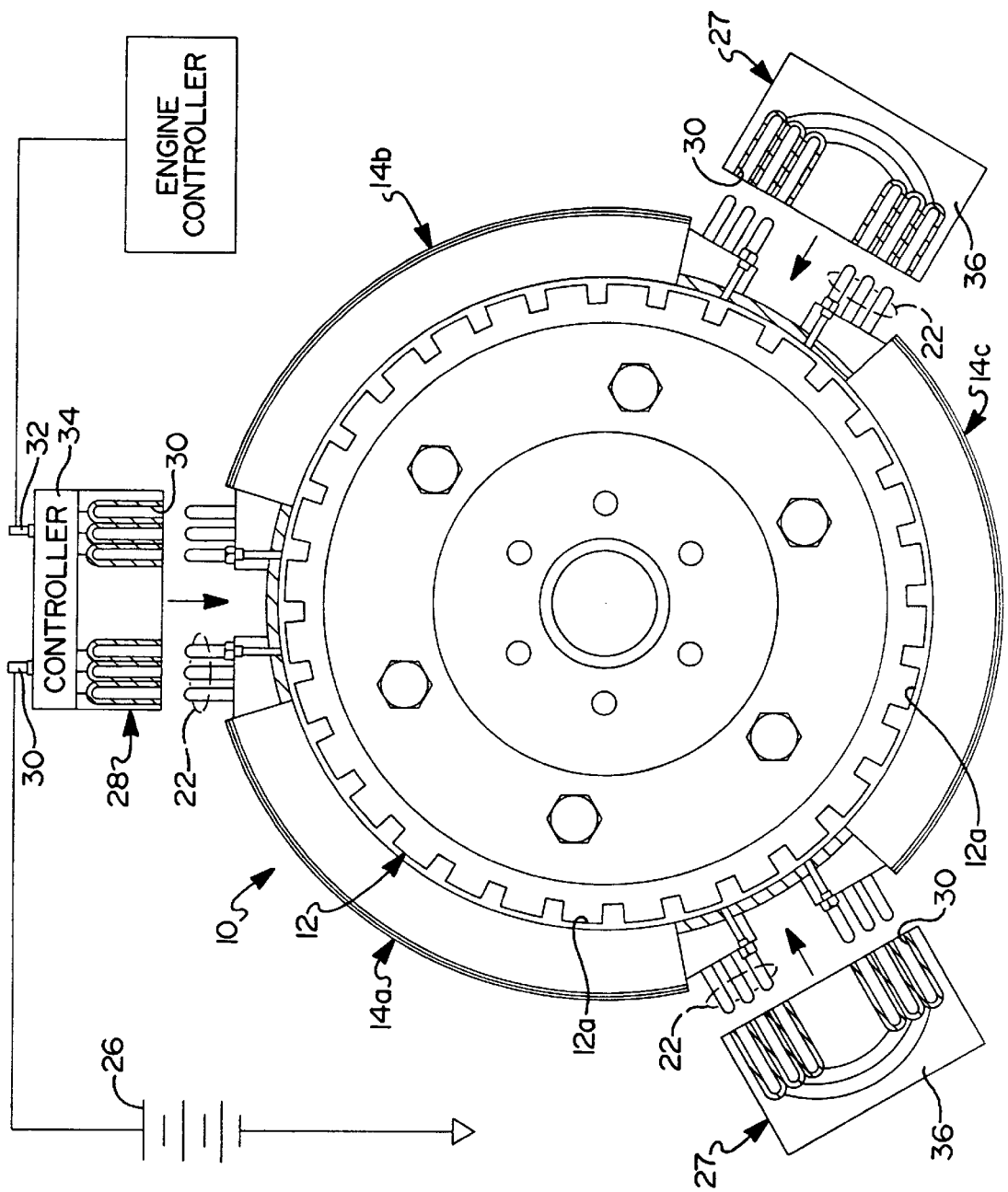

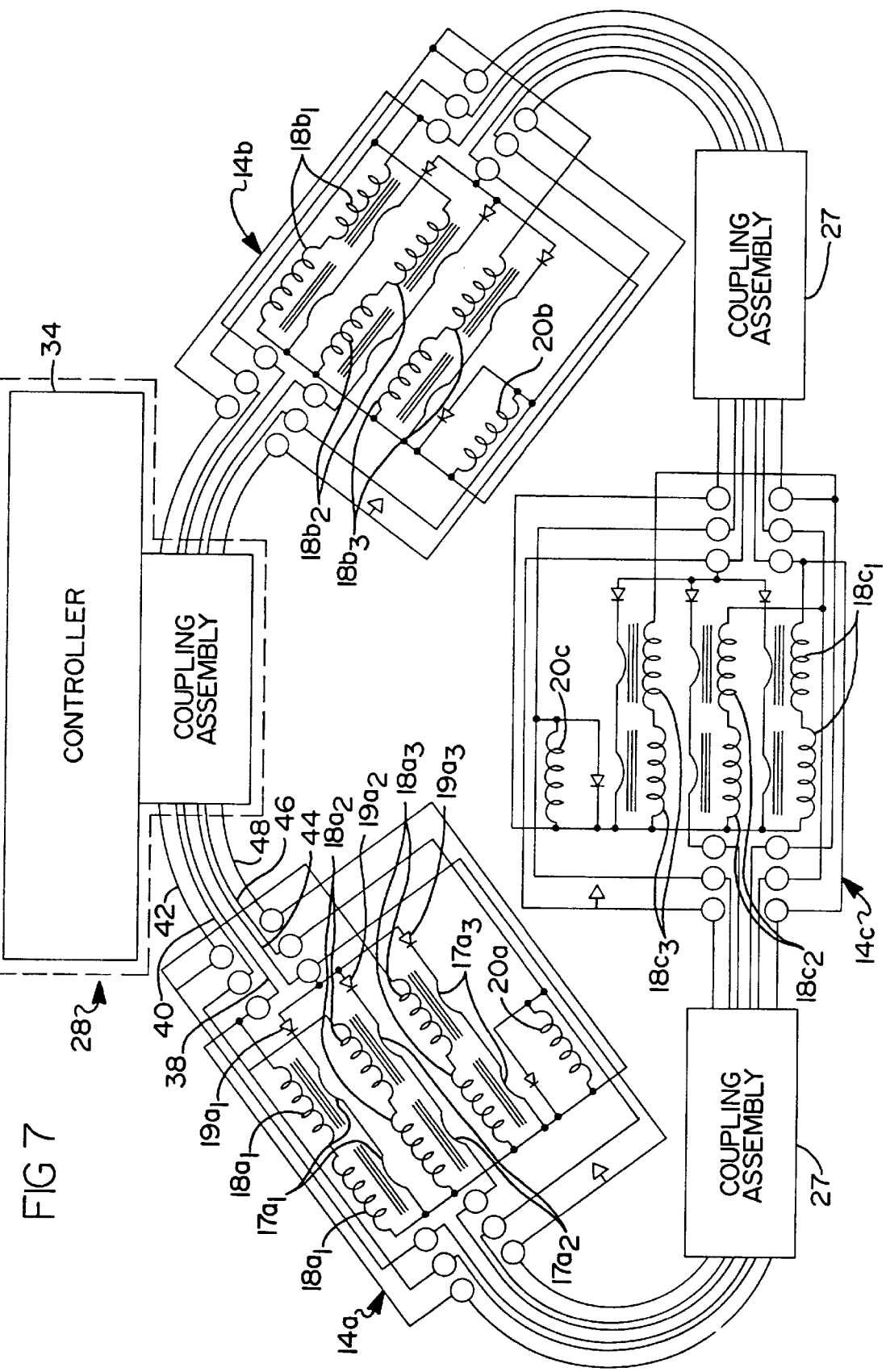

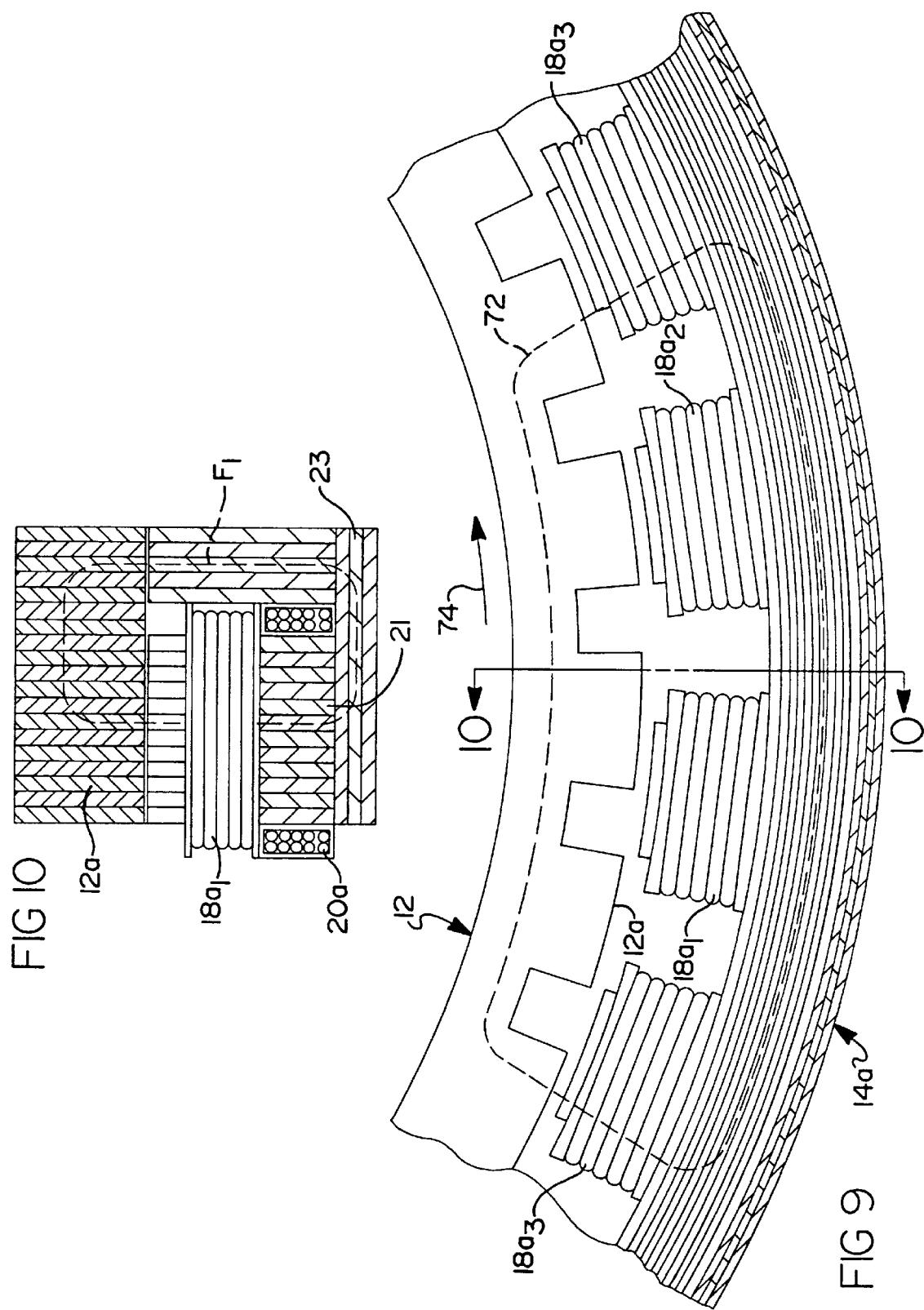

MULTI-FUNCTION VEHICLE STARTER AND ALTERNATOR AND METHOD THEREFOR

BACKGROUND OF THE INVENTION

1. Technical Field

This invention relates to motor vehicle starter and alternator systems, and more particularly to a multi-function apparatus adapted to perform the functions of starting the engine of a vehicle as well as functioning as an alternator to take the place of a conventional starter and alternator typically used with vehicles having internal combustion engines.

2. Discussion

Most vehicles which are powered by an internal combustion engine incorporate a starter for starting the engine. As is well known in the industry, the starter is an independent component which is typically mounted on or near the bell housing of the vehicle's power train. The starter typically includes a gear which is moveable into meshing engagement with the teeth of a flex plate of the vehicle engine to rotate the flex plate when it is desired to start the engine. This is accomplished when the ignition switch of the vehicle is turned on by a user and battery power is applied to the starter. As can be appreciated, the starter forms an independent component part which adds to the overall cost of the vehicle.

Present day motor vehicles also incorporate an alternator for recharging the battery while the vehicle is in use. The alternator is typically driven by a belt which is attached to a pulley, where the pulley is secured to an output shaft of the vehicle's engine. The alternator, likewise, thus forms a separate component part which also adds to the cost of the vehicle. Moreover, the belt necessary to drive the alternator contributes to the cost associated with this component of the vehicle engine.

It would be highly desirable to provide a multi-function apparatus which performs the functions of starting the vehicle as well as acting as an alternator while the vehicle engine is running. It would further be highly desirable if such an apparatus could be integrated into the vehicle engine in a manner such that the apparatus does not require significantly added space within the engine compartment of the vehicle. It would further be highly desirable if such an apparatus could be included without significantly increasing the overall cost and weight of the vehicle.

SUMMARY OF THE INVENTION

The above and other objects are provided by a multi-function apparatus for performing starter and alternator functions, in accordance with preferred embodiments of the present invention. The apparatus generally includes a rotor having a plurality of poles spaced about a periphery thereof which is attached to a flex plate of the engine of the vehicle, and a stator which is supported on a bell housing of the vehicle's transmission. The stator circumscribes the rotor and, in one preferred embodiment, is comprised of a plurality of independent stator sectors which are electrically interconnected to one another and to a battery of the vehicle. Each stator sector includes a field winding and a plurality of independent stator coils spaced therealong. A control system is incorporated for controlling the application of electric current to the field windings and to the stator coils to permit the apparatus to function either as a starter or as an alternator as needed.

In the preferred embodiment the control system incorporates a plurality of electrical switches which are used to couple the field winding, as well as each of the stator coils, to the battery. In a "starter" mode, the control system energizes the field winding of the stator and monitors the electrical signal inductively generated by the stator coils. Depending upon which ones of the stator coils provide the greatest output signal, the control system selectively energizes certain ones of the stator coils by connecting same to the vehicle battery. This energization of the stator coils causes a plurality of magnetic fields to be generated by the energized stator coils which causes certain ones of the poles of the rotor to be urged in a desired rotational direction to turn the output shaft of the engine and thereby start the engine.

In an "alternator" mode, only the field winding is energized. As the rotor poles, which include ferro-magnetic materials, pass across the stator coils while the engine is running, this causes electrical currents to be inductively generated by the stator coils. This electrical energy is returned to the battery to recharge the battery and also used to power the various electrical accessories of the vehicle.

In a preferred embodiment of the present invention the stator is formed by a plurality of independent stator sectors which are electrically interconnected by a plurality of electrical coupling assemblies. Accordingly, very little additional cabling is required to be added to the vehicle's wiring harness. Each stator sector includes a field winding and a plurality of independent stator coils. Each of the field windings are further interconnected in parallel by the electrical coupling assemblies, while a first one of the stator coils of each one of the stator sectors are coupled in parallel, a second one of each of the stator sectors are coupled in parallel, and so forth, depending upon the total number of stator coils employed. The control system further employs a detection system for detecting the magnitude of the signal inductively generated by each group of stator coils and, depending upon the detected magnitudes, determines which plurality of stator coils needs to be energized to begin urging the rotor in the proper rotational direction to effect starting.

In addition to acting as a starter and an alternator, the apparatus of the present invention can be used to smooth out the idle of the engine at very low rpms, such as below about 600 rpm. This can readily be accomplished by using the control system to detect the positions of the rotor poles relative to the groups of stator coils and to selectively energize the groups of stator coils to assist in urging the rotor, and thereby the output shaft of the engine, rotationally to smooth out the idle of the engine.

The method of the present invention involves disposing a rotor having a plurality of poles adjacent to a flex plate of the engine and disposing a stator in a manner so as to generally circumscribe the rotor. The stator incorporates at least one field winding and a plurality of stator coils spaced around the periphery of the rotor so as to be closely adjacent the rotor poles. An electrical signal is applied to the field winding and the inductively generated output signals from each of the stator coils are monitored by a control system. The control system is used to determine the position of the rotor poles relative to the stator coils and to selectively energize the stator coils to cause the rotor to begin moving in the desired direction, to thereby accomplish starting of the engine. In an alternator mode, the field winding is energized and the voltages inductively generated in the stator coils by the continuous realignment of stator poles are used to recharge the battery of the vehicle.

The apparatus and method of the present invention provides the significant advantage of performing the function of both a starter and an alternator for a vehicle engine without significantly adding to the cost of the engine or to its overall outer dimensions or weight. Moreover, the apparatus and method does not require appreciable electrical cabling to be added to the vehicle's wiring harness. The apparatus and method thus enables an engine to be constructed which is simpler in construction and which has improved reliability.

BRIEF DESCRIPTION OF THE DRAWINGS

The various advantages of the present invention will become apparent to one skilled in the art by reading the following specification and subjoined claims and by referencing the following drawings in which:

FIG. 1 is a front view of the present invention illustrating the stator of the invention secured to a bell housing of the vehicle and a rotor of the invention secured to a flex plate associated with the vehicle engine;

FIG. 2 is a cross sectional side view in accordance with section line 2—2 in FIG. 1 illustrating the orientation of the rotor relative to the stator;

FIG. 3 is a front view of one stator sector;

FIG. 4 is a view of the stator sector of FIG. 3 taken in accordance with directional arrow 4 in FIG. 3;

FIG. 5 is a view of the stator sector of FIG. 4 taken in accordance with section line 5—5 in FIG. 4;

FIG. 6 is a view of the apparatus of the present invention including the stator coupling assemblies, the controller, and the coupling of the controller to the vehicle battery and to the engine controller of the vehicle;

FIG. 7 is a simplified electrical schematic diagram of a preferred embodiment of the present invention incorporating three independent stator sectors interconnected by three stator coupling assemblies;

FIG. 9 is a fragmentary, enlarged, partial cross sectional view of a portion of one stator sector illustrating the path of the magnetic flux produced by the first plurality of stator coils when same are energized, as well as the path of the magnetic lines of force produced by the field winding; and FIG. 10 is a cross sectional view of the stator sector of FIG. 9 taken in accordance with section line 10—10 in FIG. 9 and further illustrating the path of magnetic flux produced by an energized stator coil.

DETAILED DESCRIPTION OF THE PREFERRED EMBODIMENTS

Figure 8:
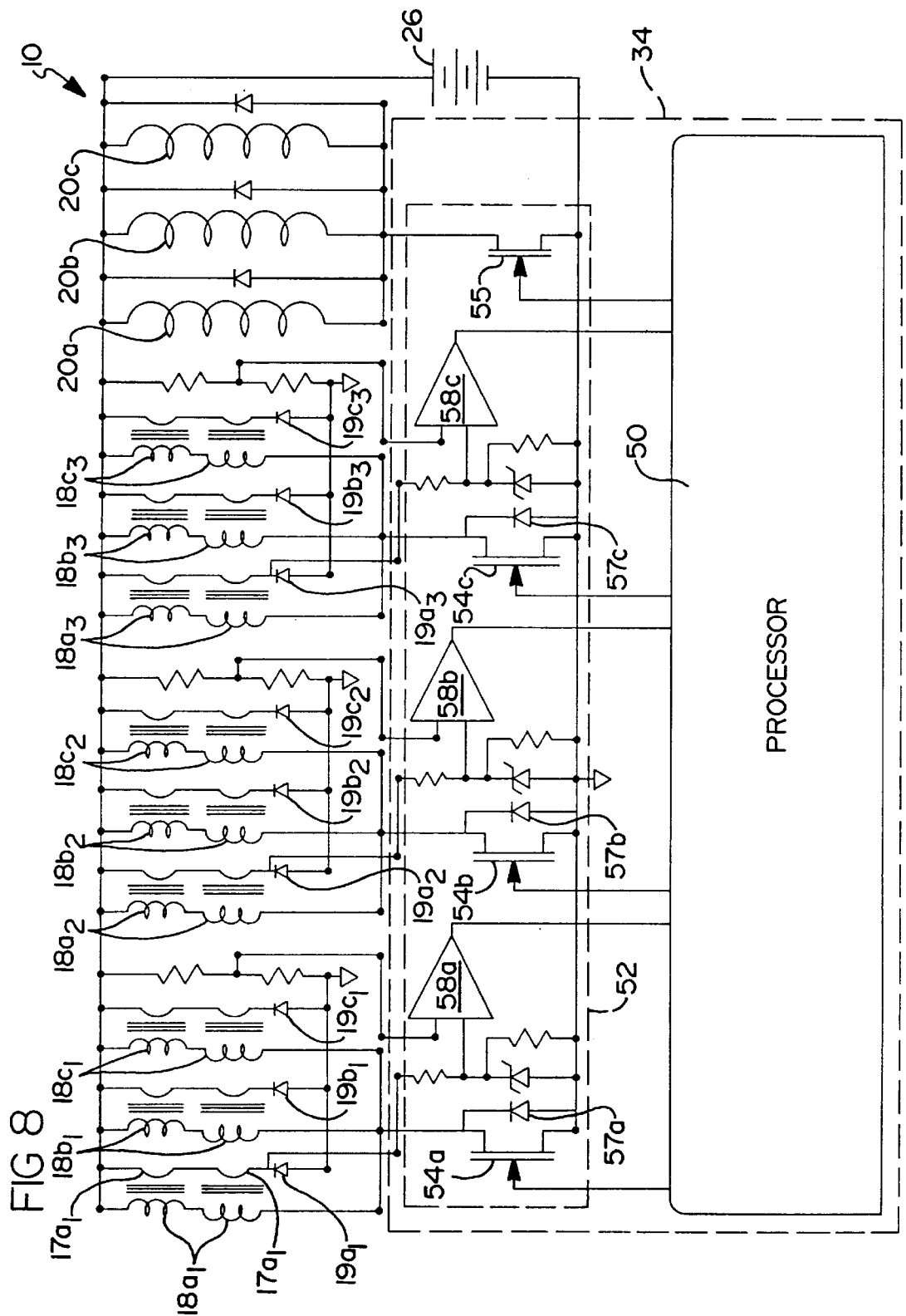
FIG. 8 is a simplified electrical schematic diagram of the apparatus also showing in greater detail the detection and switching systems in communication with the processor.

Referring to FIGS. 1 and 2, there is illustrated a multi-function apparatus 10 for performing the functions of the starter and alternator for an internal combustion engine of a vehicle. The apparatus 10 generally comprises a rotor 12 having a plurality of rotor poles 12a and a stator 14. The rotor 12 is secured to a conventional flex plate 11 which is attached to the crankshaft 11a of the vehicle's engine 11b, the flex plate 11a and the engine 11b being shown in simple diagrammatic fashion. The vehicle may comprise any type of vehicle having an internal combustion engine which would normally require a separate starter and alternator. With brief reference to FIG. 2, the stator 14 is secured to a bell housing 16 which enshrouds a torque converter 17 of the vehicle. The bell housing 16 includes a plurality of openings 16a spaced circumferentially therearound through which a plurality of stator coils 18 of the stator 14 protrude. The stator coils 18 project inwardly of the bell housing 16 such that same are in close proximity to the rotor poles 12a of the rotor 12 as the rotor 12 rotates.

With further reference specifically to FIG. 1, in the preferred embodiment the stator 14 is comprised of a plurality of independent stator sectors 14a, 14b and 14c which circumscribe the rotor 12. It will be appreciated, however, that a greater or lesser number of stator sectors 14 could be employed. Three independent stator sectors 14a, 14b and 14c, however, are illustrated only for exemplary purposes and should not be interpreted as limiting the invention to any particular number of stator sectors.

Each stator sector 14a, 14b and 14c includes a field winding 20a, 20b and 20c, respectively, and a plurality of stator coils 18. Stator section 14a includes a plurality of pairs of stator coils $18a_1$, $18a_2$, and $18a_3$ which are spaced apart along the length of the stator sector 14. Similarly, stator sector 14b includes a pair of each of stator coils $18b_1$, $18b_2$ and $18b_3$ spaced apart therealong. Stator section 14c also includes pairs of stator coils $18c_1$, $18c_2$ and $18c_3$ spaced apart along the length thereof. It will be appreciated that for each stator coil 18, a corresponding opening is required in the bell housing 16 (FIG. 2) or, alternatively, an elongated, slot-like opening formed in the bell housing 16 through which each of the stator coils 18 of each stator sector 14a, 14b and 14c are able to project through so as to be in close proximity to the rotor poles 12a. It will also be appreciated that each stator sector 14 could comprise a greater or lesser plurality of stator coils 18. Increasing the number serves to increase the degree of control over movement of the rotor provided suitable corresponding electronic circuitry is provided for energizing each of the stator coils 18.

With brief reference to FIG. 10, the construction of one of the stator coils $18a_1$ is shown. Field winding 20a surrounds a core 21, which in turn is secured to an outer L-shaped, metallic base portion 23. A rotor pole 12a is also shown closely adjacent a core $18a_1$ of stator coil $18a_1$. The path of the magnetic lines of flux is shown by dashed line $F_1$.

Referring now to FIG. 3, stator sector 14b is illustrated. The stator sector 14b includes an electrical connector $22b_1$ electrically interconnected to stator coils $18b_1$, an electrical connector $22b_2$ electrically connected to stator coils $18b_2$ and an electrical connector $22b_3$ electrically connected to stator coils $18b_3$. Stator sectors 14a and 14e each are constructed in identical fashion to sector 14b. With brief reference to FIGS. 4 and 5, it can be seen that stator sector 14b also includes an opening 24 at each end through which bolts or other like fastening members may be used to hold the stator sector 14b fixedly to the bell housing 16. Electrical connector $22b_4$ is electrically coupled to the field winding 20b of the stator 14. Electrical connector $22b_5$ is electrically coupled in parallel to a common side of each stator coil 18 and the field coil 18, and couples the stator sector 14b to ground (i.e., the vehicle's chassis ground).

Referring now to FIG. 6, the apparatus 10 is illustrated coupled to a vehicle battery 26. Each of the stator sectors 14a, 14b and 14c are intercoupled by a plurality of electrical coupling assemblies 27 and 28. Each of the coupling assemblies 27 and 28 include a plurality of recesses 30 which include an electrically conductive lining or material adapted to electrically couple with the terminals 22 at each end of adjacent stator sectors 14 to electrically couple the field windings 20 of each stator sector 14 in parallel, and also to electrically couple selected stator coils 18 of each stator sector 14 in parallel with one another. Coupling assembly 28 also provides a connection terminal 30a for coupling to the vehicle battery 26 and a connection terminal 32 for receiving a signal from the engine controller. Coupling assembly 28 further includes a controller system 34, which will be described in greater detail momentarily.

Each of the coupling assemblies 27 and 28 include a housing 36 made from a non-conductive, heat resistant and durable material such as polyvinylchloride (PVC). The coupling assemblies 27 and 28 therefore significantly simplify the integration of the apparatus 10 into the vehicle engine 11$b$ by minimizing the additional cabling that must be used in connection with the vehicle's wiring harness to send and receive signals from the vehicle's engine controller to the apparatus 10. It will also be appreciated that each of the coupling assemblies 27 and 28 may be fixedly secured to portions of each of the stator sectors 14$a$, 14$b$ and 14$c$, if desired, through the use of conventional tapped holes and threaded fasteners or alternatively through the use of adhesives or other fastening means.

Referring now to FIG. 7, the electrical interconnection of the field windings 20$a$, 20$b$ and 20$c$, as well as the electrical interconnection of the stator coils 18 can be seen. The groups of stator coils 18$a_1$, 18$b_1$ and 18$c_1$ are all coupled in parallel. Stator coils 18$a_2$, 18$b_2$ and 18$c_2$ are also all coupled in parallel. Similarly, stator coils 18$a_3$, 18$b_3$ and 18$c_3$ are all coupled in parallel. The field windings 20$a$, 20$b$ and 20$c$ are similarly all coupled in parallel. Accordingly, an electrical signal applied to conductor 38 will energize all of the stator coils 18$a_1$, 18$b_1$ and 18$c_1$. An electrical signal applied to conductor 40 will similarly energize all of stator coils 18$a_2$, 18$b_2$ and 18$c_2$. An electrical signal applied to conductor 42 will simultaneously energize stator coils 18$a_3$, 18$b_3$ and 18$c_3$.

With further reference to FIG. 7, conductor 44 is coupled to the chassis ground of the vehicle and connects all of the stator coils 18 and field windings 20 to the chassis ground of the vehicle. Conductor 46 couples each of the field windings 20$a$, 20$b$ and 20$c$ in parallel and conductor 48 couples each of the stator coils 18 in parallel with a conductor for applying battery power to the coils 18.

With further reference to FIG. 7, each stator coil 18 includes a secondary coil 17 associated therewith. For example, secondary coil 17$a_1$, is associated with stator coil 18$a_1$, secondary coil 17$b_2$ is associated with stator coil 18$b_2$ and secondary coil 17$c_3$ is associated with stator coil 18$c_3$ and so forth.

With continued reference to FIG. 7, each stator coil 18 also includes a diode 19 associated therewith. Like the secondary coils 17, diode 19$a$, is associated with stator coil 18$a_1$, diode 19$b_2$ is associated with stator coil 18$b_2$ and diode 19$c_3$ is associated with stator coil 18$c_3$, and so forth. Each diode 19 and its associated secondary coil 17 act together to cause their associated stator coil 18 to be highly inductive during turn-on and relatively non-inductive during turn off because the secondary coil 17 and the diode 19 provide a means of returning the energy stored in the magnetic field of the associated stator coil 18 to the battery 26.

Referring now to FIG. 8, the controller 34 is shown in greater detail coupled to each of the stator sectors 14$a$, 14$b$ and 14$c$. The controller 34 includes a processor 50 and a detection/switching system 52. The detection portion of detection switching system 52 is comprised of metal oxide silicon field effect transistors (MOSFET) 54$a$, 54$b$ and 54$c$. MOSFET 54$a$ has its source coupled in parallel to each of the stator coils 18 to complete a circuit when turned on via a switching signal from the processor 50 via control line 56$a$, to thereby permit current flow through each of the stator coils 18$a_1$–18$a_3$ and secondary coils 17$a_1$–17$a_3$. Similarly, MOSFET 54$b$, when turned on by the processor 50 via a signal on control line 56$b$, allows current from the battery 26 to flow through the stator coils 18$b_1$–18$b_3$ and secondary coils 17$b_1$–17$b_3$. MOSFET 54$c$ also completes a circuit path when turned on by a signal on control line 56$c$ by the processor 50 to energize each of the stator coils 18$c_1$–18$c_3$ and each of the secondary coils 17$c_1$–17$c_3$. It will be appreciated that while MOSFETs are illustrated as the power switching devices, other suitable components such as IGB-JTs (Insulated Gate Bipolar Junction Transistors) could also be used.

Referring further to FIG. 8, a MOSFET 55 has its source coupled in parallel to each of the field windings 20$a$–20$c$. The MOSFET 55 couples each of these windings across the battery 26 when the MOSFET 55 is energized by a signal on control line 56$d$ by the processor 50.

With further reference to FIG. 8, the detection portion of switching/detection system 52 is comprised of three operational amplifiers which are each configured as a comparator, and denoted by reference numerals 58$a$, 58$b$ and 58$c$. Each comparator has one input coupled to an associated voltage divider network 60 and its other input coupled to the cathode side of its associated stator sector 14, and further to a zener diode 61. The output 62$a$, 62$b$ and 62$c$ of each comparator 58$a$, 58$b$ and 58$c$ respectively, is coupled to an associated input 64, 66 and 68, respectively, of the processor 50.

In operation, when an operator first turns on the ignition of the vehicle the processor 50 turns on MOSFET 55 via a signal on control line 56$d$. This causes each of the field windings 20$a$, 20$b$ and 20$c$ of each of the stator sectors 14$a$, 14$b$ and 14$c$ to be energized simultaneously.

Referring now to FIG. 9, in the "starter" and "alternator" modes, detection of the position of the rotor 12 is detected by first pulsing "on" the three field windings 20$a$, 20$b$ and 20$c$ at a frequency in the range of about 600–3000 Hz. This causes, through a transformer action, a positive voltage across the detecting diodes 19$a$, 19$b$ and 19$c$ that is proportional to the alignment of a stator coil 18 to a rotor pole 12$a$. The better the pole alignment of any particular stator coil 18 the better the magnetic coupling between it and its associated field winding 20. The alignment of the rotor poles 12$a$ relative to the stator coils 18 determines the strength of the signal induced in each stator coil 18. FIG. 9 illustrates the position of the poles of the stator coils 18 relative to the rotor poles 12$a$ shortly after stator coils 18$a_3$ have been energized. When energized, the stator coils 18$a_3$ shown in FIG. 9 will have a north and a south polarity. The path of the magnetic lines of flux is indicated by dashed line 72. In FIG. 9, the rotor pole 12$a_1$, being centered over stator coil 18$a_3$, will produce the strongest signal. These voltages generated by the stator coils 18 are detected by the processor 50 by monitoring the output of each comparator 58$a$, 58$b$ and 58$c$. In this manner the processor 50 is able to detect the position of the rotor poles 12$a$ relative to the stators 18.

To assist in the starting of the engine 11$b$ of the vehicle, the processor 50 determines through a preprogrammed look-up table or algorithm which of the stator coils 18 need to be energized to cause movement of the rotor 12 in the desired direction to assist in starting the vehicle's engine. For example, in FIG. 9, if the rotor 12 must be moved in the direction of arrow 74 to accomplish starting, the processor 50 will be required to energize all of the stator coils which comprise the third group of stator coils (i.e., stator coils 18$a_3$, 18$b_3$ and 18$c_3$) for a brief, predetermined time interval. Subsequently, the processor 50 causes a different selected group of stator coils 18 to be briefly energized, and then a different group, etc. In this manner, magnetic fields are generated to cause movement of the rotor 12 in the direction needed to accomplish starting.

In the alternator mode the field windings 20a, 20b and 20c are energized in accordance with a duty cycle controlled by the processor 50 in response to the detected battery voltage. When the field is on, the continuous re-aligning of the stator poles associated with stator coils 18 to the rotor poles 12a as the rotor 12 is turned by the engine causes the magnetic flux F1 to vary in magnitude. This generates voltages at the stator coils 18 which causes the primary charging current to flow through diodes 19 (FIGS. 7 and 8) and a secondary charging current to flow through diodes 57a, 57b and 57c and through the battery 26. An advantage provided by the apparatus 10 of the present invention is that the relatively large diameter of the rotor 12 results in an angular velocity of the rotor poles 12a which is significantly greater than that which is obtained with a conventional automotive alternator. Since the magnitude of the signals inductively generated by the stator coils 18 is determined in part on the speed at which the rotor poles 12a pass the stator coils 18, this translates into a more efficient charging function. Similarly, the large diameter of the rotor 12 contributes to greater output torque generated in the starting function.

Yet another advantage provided by the apparatus 10 is the ability to smooth out the engine idle at very low engine idle speeds. As will be appreciated, engine output is compromised by a need for reasonable idle quality. Traditionally, engine output has been improved by valve opening overlap, which generally deteriorates engine idle stability. The apparatus 10 can readily be implemented to function as an electric motor by selectively pulsing "on" various groups of the stator coils 18 while the engine is running to help maintain engine idle speed constant at idle speeds as low as 300 rpm, or possibly even lower.

It will be appreciated then that the apparatus and method 10 of the present invention provides a means by which several functions (i.e., engine starting, alternator and engine speed stabilization) can be accomplished through one apparatus and method. The apparatus 10 of the present invention is further comprised of a relatively few number of component parts and does not add appreciably to the cost or complexity of the vehicle engine, its wiring harness or its associated electronics.

Still another advantage of the present invention is the ability to propel the vehicle even without the internal combustion engine operating. This ability enables the vehicle to be operated in heavy stop-and-go traffic and can help significantly reduce emissions and promote fuel economy. The amount of operating time would obviously be determined largely from the capacity of the vehicle's battery.

Still another advantage of the present invention is its ability to operate as a "power booster" to provide additional acceleration or power as needed. In such situations, the apparatus 10 is engaged (i.e., electrically energized with battery current) to provide the additional power needed for the vehicle.

Yet another advantage of the present invention is its ability to function as an electric brake to assist in providing engine braking for a vehicle. When it is desired to stop the vehicle, the apparatus 10 is energized in its alternator mode, which acts as a drag in the vehicle's powertrain thus slowing down the vehicle.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

We claim:

1. A multifunction apparatus for use with a vehicle engine having a bell housing including a plurality of openings spaced circumferentially therearound, and a battery associated with said engine, said apparatus operating as at least one of a starter to assist in starting said engine or as an alternator to supply electric current to charge the battery and to power various electrical subsystems of the vehicle, said apparatus comprising:

a circular rotor having a plurality of poles spaced about a periphery thereof and secured to a flexplate of said engine;

a stator supported by a bell housing of said vehicle, said stator having a plurality of independent stator sectors disposed about said bell housing so as to circumscribe said bell housing;

each said sector having a field winding, a first stator coil and a second stator coil, said stator coils being spaced apart along the length of said sector, and said first stator coils being coupled in parallel and said second stator coils being coupled in parallel, and each of said stator coils disposed to protrude at least partially through said openings so as to project toward said poles of said rotor and to be spaced closely adjacent said poles;

a designated one of said field windings of each of said sectors being coupled in parallel and to a field winding switch such that all of said designated field windings are energized simultaneously when said field winding switch is energized; and a control system for coupling said designated field windings to said battery to energize said designated field windings and for monitoring an electrical current generated at each of said stator coils to determine the rotational position of said rotor relative to said stator coils, and for selectively coupling either said first stator coils or said second stator coils to said battery to cause said connected stator coils to each generate a magnetic field which urges said poles of said rotor in a desired rotational direction to assist in starting said engine.

2. The apparatus of claim 1, wherein said control system further comprises a first switch coupled to said first stator coils and a second switch coupled to said second stator coils; and a detection system for detecting the positions of said poles of said rotor relative to said stator coils and for determining whether said first switch or said second switch is to be energized to assist in starting said engine.

3. The apparatus of claim 2, further comprising a secondary coil and a diode associated with each said stator coil.

4. The apparatus of claim 2, further comprising a processor for activating said first switch, said second switch and said field winding switch.

5. The apparatus of claim 4, wherein said control system further comprises a first comparator associated with said first stator coils and a second comparator associated with said second stator coils;

each of said comparators being operable to compare the strength of a signal inductively generated by its associated stator coils against a reference signal when said field windings are energized; and said processor being operable to determine which of said first and second pluralities of stator coils is generating a greater signal and to energize one of said switches in response to said determination to cause one of said pluralities of stator coils to be energized, thereby generating a magnetic field about said energized stator coils which urges said rotor poles, and therefore said rotor, in a desired direction.

6. An apparatus for performing the functions of an alternator and a starter for a motor vehicle having an internal combustion engine, a bell housing, and a flex plate coupled to a crankshaft of said engine, said apparatus comprising:

a circular rotor having a plurality of poles spaced about circumferentially about a periphery thereof and being secured to said flex plate;

a stator supported by a bell housing of said vehicle, said stator having a plurality of independent stator sectors arranged on said bell housing so as to circumscribe said rotor;

a plurality of stator sector coupling assemblies for electrically coupling said stator sectors;

each said stator sector including a field winding and a plurality of stator coils, said stator coils being spaced apart along said stator sector and disposed closely adjacent said rotor poles, a first one of said stator coils of each of said stator sectors being coupled in parallel to form a first plurality of stator coils, a second one of said stator coils of each of said stator sectors being coupled together in parallel to form a second plurality of stator coils, and each of said field windings being coupled together in parallel portions of each one on said coils projecting through circumferentially spaced openings in said bell housing;

a control system including:
  a processor;
  a detection system in communication with said processor for energizing said field windings and determining the strength of the signals inductively generated by said stator coils, to thereby enable said processor to determine the position of said rotor poles relative to said stator coils; and
  a switching system responsive to said processor and including a plurality of switches selectively energizable by said processor for controllably energizing said first and second pluralities of stator coils, when said apparatus is in a starter mode, based on said determined position of said rotor poles relative to said stator coils, to thereby generate a plurality of magnetic fields at said energized ones of said stator coils, said magnetic fields causing said rotor poles to be urged rotationally in a desired direction to assist in starting said engine; and said field windings being energized by said processor when said apparatus is in an alternator mode to enable said apparatus to function as an alternator, wherein electrical energy inductively generated by each of said stator coils as a result of movement of said rotor poles therepast during rotation of said rotor is returned to said battery.

7. The apparatus of claim 6, where in said detection system comprises:

a first comparator associated with said first plurality of stator coils; and a second comparator associated with said second plurality of stator coils;

each of said comparators providing an output signal to said processor indicative of the strength of the signal generated by its associated stator coils when said field windings are energized.

8. The apparatus of claim 6, wherein said switching system comprises a first metal oxide silicon field effect transistor (MOSFET) associated with said first ones of said stator coils, and a second metal oxide silicon field effect transistor (MOSFET) associated with said second ones of said stator coils.

9. The apparatus of claim 6, further comprising a secondary coil and a diode associated with each of said stator coils to facilitate an inductive action when each said stator coil is electrically energized by said processor, and to facilitate a non-inductive action when said stator coil is not being electrically energized by said processor.

10. A method for assisting in the starting of an engine of a motor vehicle, wherein the motor vehicle has an output shaft, said method comprising the steps of:

securing a rotor having a plurality of poles to said output shaft;

disposing a non-moveable stator having at least one field winding and a plurality of stator coils around said rotor so as to circumscribe said rotor, with said stator coils being disposed closely adjacent said rotor poles;

using a control system to electrically energize said field winding;

using said control system to determine the strength of each electrical signal inductively generated by each said stator coil in response to energization of said field winding; and using said control system to electrically energize selected ones of said stator coils in response to said determined strengths of said electrical signals generated by said stator coils to thereby cause selected ones of said stator coils to generate magnetic fields adjacent certain ones of said rotor poles to urge said rotor in a desired rotational direction to assist in starting said engine.

11. The method of claim 10, comprising the steps of:

de-energizing said field coil and said stator coils once said engine has been started;

using the movement of said rotor poles to generate electrical energy ins aid stator coils; and returning said electrical energy generated by said stator coils to a battery of said vehicle.

\* \* \* \* \*